US008102546B2

(12) United States Patent
Ebuchi

(10) Patent No.: US 8,102,546 B2
(45) Date of Patent: Jan. 24, 2012

(54) INFORMATION PROCESSING APPARATUS AND INFORMATION PROCESSING METHOD

(75) Inventor: Kazuhisa Ebuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1043 days.

(21) Appl. No.: 12/015,744

(22) Filed: Jan. 17, 2008

(65) Prior Publication Data

US 2008/0180711 A1    Jul. 31, 2008

(30) Foreign Application Priority Data

Jan. 29, 2007  (JP) ................................ 2007-017878

(51) Int. Cl.
*G06K 15/00* (2006.01)
*G06F 3/12* (2006.01)
*G03G 15/00* (2006.01)

(52) U.S. Cl. ..................... 358/1.14; 358/1.12; 358/1.13; 358/1.15; 358/1.18; 399/82

(58) Field of Classification Search ................ 358/1.2, 358/1.12–1.18; 399/391, 9, 11, 23, 24, 38, 399/81, 82, 367, 369
See application file for complete search history.

(56) References Cited

U.S. PATENT DOCUMENTS

| 6,041,200 A * | 3/2000 | Glass et al. ..................... 399/82 |
| 6,751,426 B2 * | 6/2004 | Akiba et al. ................... 399/82 |
| 7,436,532 B2 * | 10/2008 | Tsujimoto ................... 358/1.15 |

FOREIGN PATENT DOCUMENTS

| JP | 61-177856 U | 11/1986 |
| JP | H07-134707 A | 5/1995 |
| JP | 11-000990 A | 1/1999 |
| JP | 2001-260425 A | 9/2001 |
| JP | 2001-331299 A | 11/2001 |
| JP | 2004-246733 A | 9/2004 |
| JP | 2005-037837 A | 2/2005 |
| JP | 2005-349707 A | 12/2005 |
| JP | 2006-155470 A | 6/2006 |

* cited by examiner

*Primary Examiner* — James A Thompson
*Assistant Examiner* — Jonathan Beckley
(74) *Attorney, Agent, or Firm* — Canon USA Inc IP Division

(57) ABSTRACT

An apparatus determines a type of a printing paper which is fed from a paper feed port of a printer. If it is determined that a print setting of a print target page does not match the type of printing paper fed from the paper feed port, the apparatus requests the printer to eject the printing paper set in the paper feed port and sends data of a print target page if a print setting of a print target page matches a type of a printing paper fed from the paper feed port after the printer has executed a paper ejection, or alternatively, the apparatus stores information about the print target page and determines whether a print setting of a page to be sent subsequent to the print target page in the print data matches the type of a printing paper fed from the paper feed port.

20 Claims, 11 Drawing Sheets

FIG.10

PAPER SIZE MISMATCH

THE PAPER SIZE SETTING OF THE PRINT TARGET PAGE (PAGE 24) DOES NOT MATCH THE SIZE OF PAPER SET IN THE PAPER FEED PORT OF THE PRINTER.
PLEASE SELECT THE NEXT PROCEDURE.

- ⦿ EJECT PAPER UNTIL SIZE OF PAPER SET IN PAPER FEED PORT MATCHES PAPER SIZE SETTING OF PRINT TARGET PAGE ~1301
- ○ CONTINUE PRINTING
- ○ SKIP PAGES OF PRINT DOCUMENT UNTIL PAGE MATCHES SIZE OF PAPER SET IN PAPER FEED PORT
- ○ CANCEL PRINTING
- ○ CHANGE PAPER

[ EXECUTE ]

INFORMATION PROCESSING APPARATUS AND INFORMATION PROCESSING METHOD

BACKGROUND OF THE INVENTION

1. Field of the Invention

The present invention relates to a method for printing a print document that includes a plurality of pages, which allows a user to make print settings for each page. In particular, the present invention relates to a technology which allows a user to easily change or set printing papers in accordance with a print setting when printing a print document that requires two or more types of printing papers, and prevents degradation of a work efficiency of the user.

2. Description of the Related Art

Conventionally, there is a print system in which a user can selectively set one or more print settings for each page of print data of a print document that includes a plurality of pages. Such print settings may include setting a paper type, paper size, direction of a paper, and a paper feed port.

For example, suppose that a user wants to print an A4-size book via a print system, in which the book includes a foldout page using an A3-size paper, i.e., page 30 and page 60 in a print document of 100 pages are foldout pages using A3-size papers. In such a case, the user can designate A3-size paper as one of the print settings (or print settings) for page 30 and page 60 using, for example, a word processor application. Additionally, the user can designate A4-size paper as one of the print settings (or print settings) for the other pages.

Moreover, if a printer includes a plurality of paper feed ports and a user can designate a specific paper feed port in a print setting for each page, the user can designate a paper feed port in which A3-size printing paper is set in the print settings of pages 30 and 60. Similarly, the user can designate a paper feed port in which A4-size printing paper is set in the print settings of pages other than pages 30 and 60. Consequently, it is not necessary for the user to change printing papers in a paper feed port to a different size when printing, and all pages can be printed at once.

Furthermore, there is a print system which includes a sensor that detects the size of the printing paper set in a paper feed port of a printer. When the paper feed port feeds a printing paper, such a print system determines whether the paper size designated in the print setting of the print target page matches the size of the printing paper. For example, if the paper size of the printing paper to be fed and the print setting does not match, the printer does not feed the printing paper. Instead, the printer notifies the user that the printer is out of paper. Consequently, printing on an inappropriate paper can be prevented.

However, there are low-end printers, such as home-use printers, that do not have a plurality of paper feed ports. In such printers, a user can not set printing papers of different sizes in one paper feed port at once. Therefore, conventionally when a user wants to print a document which includes pages that have different print settings, the user can first set only A4-size printing papers in a paper feed port and print only the pages that are set to be printed on A4-size paper. After printing on the A4-size papers, the user can change the printing papers in the paper feed port to A3-size printing papers, and print only the pages that are set to be printed on A3-size papers. Consequently, in such a case, the user is required to perform a plurality of print instructions and paper loading operations. That is, it is necessary for the user to first instruct printing of only A4-size print data (print job), and then instruct printing of only A3-size print data (print job).

Alternatively, the user first sets A4-size printing papers in the paper feed port and prints. When a page which is set to be printed on an A3-size paper is reached, the user changes the printing papers set in the paper feed port to A3-size printing papers and prints. When a page which is set to be printed on an A4-size page is again reached, the user changes the printing paper back to A4-size printing papers.

In the above-described case, if A4-size printing paper is set in the paper feed port in excess in a printer that cannot detect the size of a printing paper, the printer may print on a printing paper of an inappropriate size.

On the contrary, if the printer includes a sensor that detects the size of the printing paper set in the paper feed port, the printer can display to a user that the paper set in the paper feed port is A4-size paper when an A3-size page is to be printed. The printer can also display to the user options for choosing between changing the printing paper to A3-size paper or cancelling printing. However, in either case, the user needs to change the printing paper more than once, or cancel printing once and reprint, which is cumbersome for the user.

Examples of documents in which print settings vary for each page are photo albums, catalogues, and books. In such documents, the types of paper of the front cover, bookblock (for example, pages only for letters), illustration page, and back cover are often different. Japanese Patent Application Laid-Open No. 11-000990 discusses a technology applicable to a printer which includes a sensor that can detect a type of printing paper when printing a document. Such a printer continues to detect the paper type until printing is completed. When a print setting of the print target page does not match the printing paper set in a paper feed port, the printer requests a user to select the next procedure from the following options: cancel printing, eject paper set in the paper feed port, or change the print setting of the print target page to the size of printing paper set in the paper feed port.

However, the method discussed by Japanese Patent Application Laid-Open No. 11-000990 requires a user to set printing papers in the paper feed port by considering the paper type and the number of sheets to be printed designated in the print setting, and the order of such printing. Therefore, a user is required to perform cumbersome operations. Moreover, if there is an error in the number or the order of printing papers set in a paper feed port, printing is stopped, or the user needs to frequently change the printing paper, causing degradation of work efficiency.

SUMMARY OF THE INVENTION

An embodiment of the present invention is directed to an information processing apparatus which performs a process for realizing an efficient printing for a user when the user designates a plurality of types of paper for printing print data. The printing is efficiently performed in a case where the print setting designated by the user does not match the paper type of a printing paper which is actually fed by a printing apparatus.

According to an aspect of the present invention, an information processing apparatus includes an obtaining unit configured to obtain information on a paper type of a printing paper which is fed from a paper feed port of a printing apparatus, a paper ejection command sending unit configured to send to the printing apparatus a paper ejection command for ejecting a printing paper set in the paper feed port, a determination unit configured to determine whether a print setting of a print target page matches information about a paper type obtained by the obtaining unit, and a sending unit configured to send to the printing apparatus data of a print target page if the determination unit determines that a print setting of a print target page matches information about a paper type obtained by the obtaining unit. The information processing apparatus further includes a processing unit configured to, if the determination unit determines that a print setting of a print target page does not match information about a paper type obtained by the obtaining unit, perform one of (1) causing the paper ejection command sending unit to repeat sending to the printing apparatus a paper ejection command and the obtaining unit to repeat obtaining information about a type of a printing paper fed from the paper feed port after the printing apparatus has executed a paper ejection in response to the paper ejection command until the determination unit determines that the obtained information about a paper type of a printing paper fed from the paper feed port matches a print setting of the print target page, and causing the sending unit to send data of a print target page when a print setting of a print target page matches information about a paper type of a printing paper fed from the paper feed port, or (2) storing information about the print target page in a storage unit and causing the determination unit to determine whether a print setting of a page to be sent subsequent to the print target page in the print data matches the obtained information about a type of a printing paper fed from the paper feed port.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 illustrates a UI screen which is displayed when there is a paper size mismatch in the fourth exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
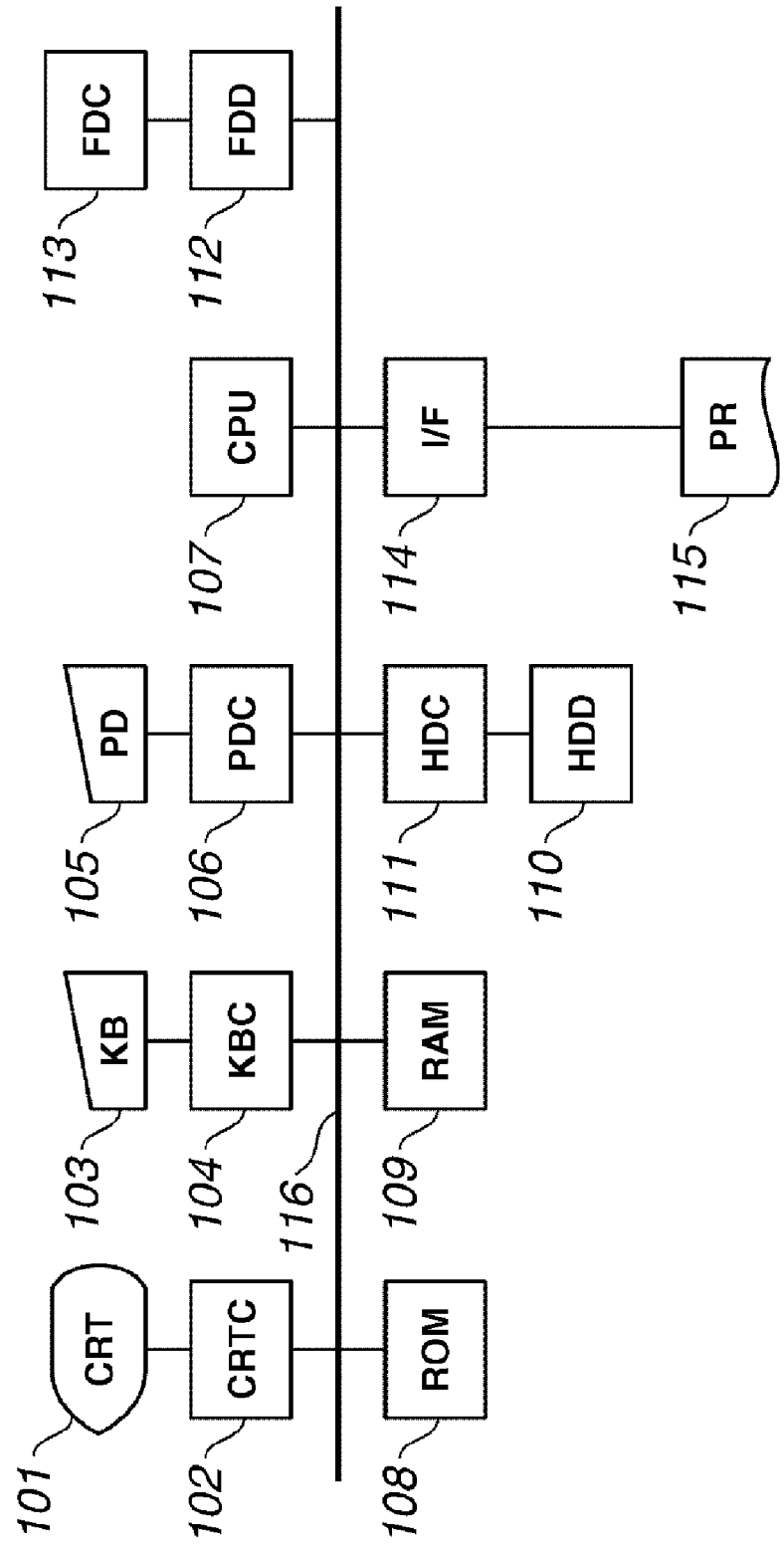
FIG. 1 is a block diagram illustrating a hardware configuration of a print system according to an exemplary embodiment of the present invention.

FIG. 1 is a block diagram illustrating a hardware configuration of a print system according to an exemplary embodiment of the present invention. In the present invention, a print system is an information processing apparatus (such as a personal computer), a printing apparatus (such as a printer, copying machine, or a multi-function peripheral), or an apparatus in which both of such apparatuses are implemented.

Referring to FIG. 1, a cathode-ray tube (CRT) 101 is a display device which displays a print setting dialog or print status information supplied by a printer driver. A CRT controller (CRTC) 102 controls the display device. A keyboard (KB) 103 is a data input device, and a keyboard controller (KBC) 104 controls the data input device. A pointing device (PD) 105 is a coordinate input device, and a pointing device controller (PDC) 106 controls the coordinate input device. A central processing unit (CPU) 107 controls the entire apparatus.

A read-only memory (ROM) 108 stores a boot program. A random access memory (RAM) 109 stores application programs and printer driver programs, and is also used as a work area. A hard disk drive (HDD) 110 stores an operating system (OS), application programs and printer driver programs, and font data, and temporarily stores a spool file. A hard disk controller (HDC) 111 controls the HDD 110. A floppy disk drive (FDD) 112 is a driving apparatus of a portable storage medium, and a floppy disk controller (FDC) 113 controls the FDD 112. An interface (I/F) 114 is connected to a printer (PR) 115, such as an ink jet printer, via an interface cable. A bus 116 connects each of the above-described devices.

When the print system is switched on, the CPU 107 is booted in accordance with the boot program stored in the ROM 108. The CPU 107 then loads the OS from the HDD 110 and waits for a user operation. When the CPU 107 receives a user instruction from the KB 103 or the PD 105 via an application to print or to change a print setting of a printer driver, a printer driver program stored in the HDD 110 is loaded onto the RAM 109 and executed. Moreover, a printer driver program stored in the HDD 110 is loaded onto the RAM 109 and executed in a case where the CPU 107 is set to be automatically booted.

The above-described print system can be implemented as an information processing apparatus (such as a personal computer) and the printer 115 which is connected to the information processing apparatus via the Internet.

Figure 7:
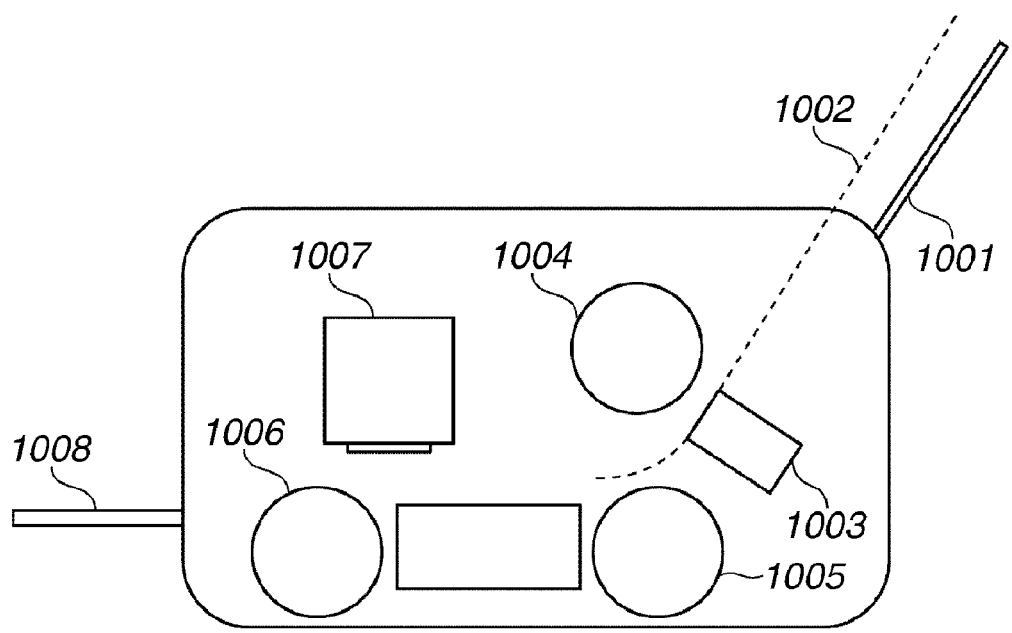
FIG. 7 illustrates a configuration of a printer according to the exemplary embodiment of the present invention.

A configuration of the printer 115 in the exemplary embodiment of the present invention will be described by referring to FIG. 7.

A feeder 1001, or a paper feed tray 1001, is the feeder of the only paper feed port in the printer 115 of the present exemplary embodiment. A printing paper 1002 is used in printing. Rollers 1004, 1005, 1006 feed, convey, and eject the printing paper 1002. A media sensor 1003 detects a type of a printing paper. A head 1007 discharges ink onto a print paper to print. A delivery tray 1008 catches a printing paper which is ejected when printing is completed.

When printing, print operation is started from a state in which the printing paper 1002 is set in the paper feed tray 1001. The printing paper 1002 is conveyed by the rollers 1004, 1005 through the media sensor 1003 and the head 1007, and ejected onto the delivery tray 1008 by the roller 1008. The position of the media sensor 1003 varies in accordance with the position of the medium which the sensor detects. There are various methods for obtaining the feature of the printing paper to determine a type of printing paper, such as previously marking a printing paper, which is a recording medium, and optically detecting the mark. Additionally, there are methods in which a unique paper feed cassette is used for setting one type of printing paper, or an integrated circuit (IC) chip is embedded into the printing paper. Therefore, the position of the sensor varies in accordance with the position of the medium to be detected. In either case, the media sensor 1003 which can determine the type of printing paper (such as size or thickness) that is fed from the paper feed port is implemented in the printer 115.

Figure 2:
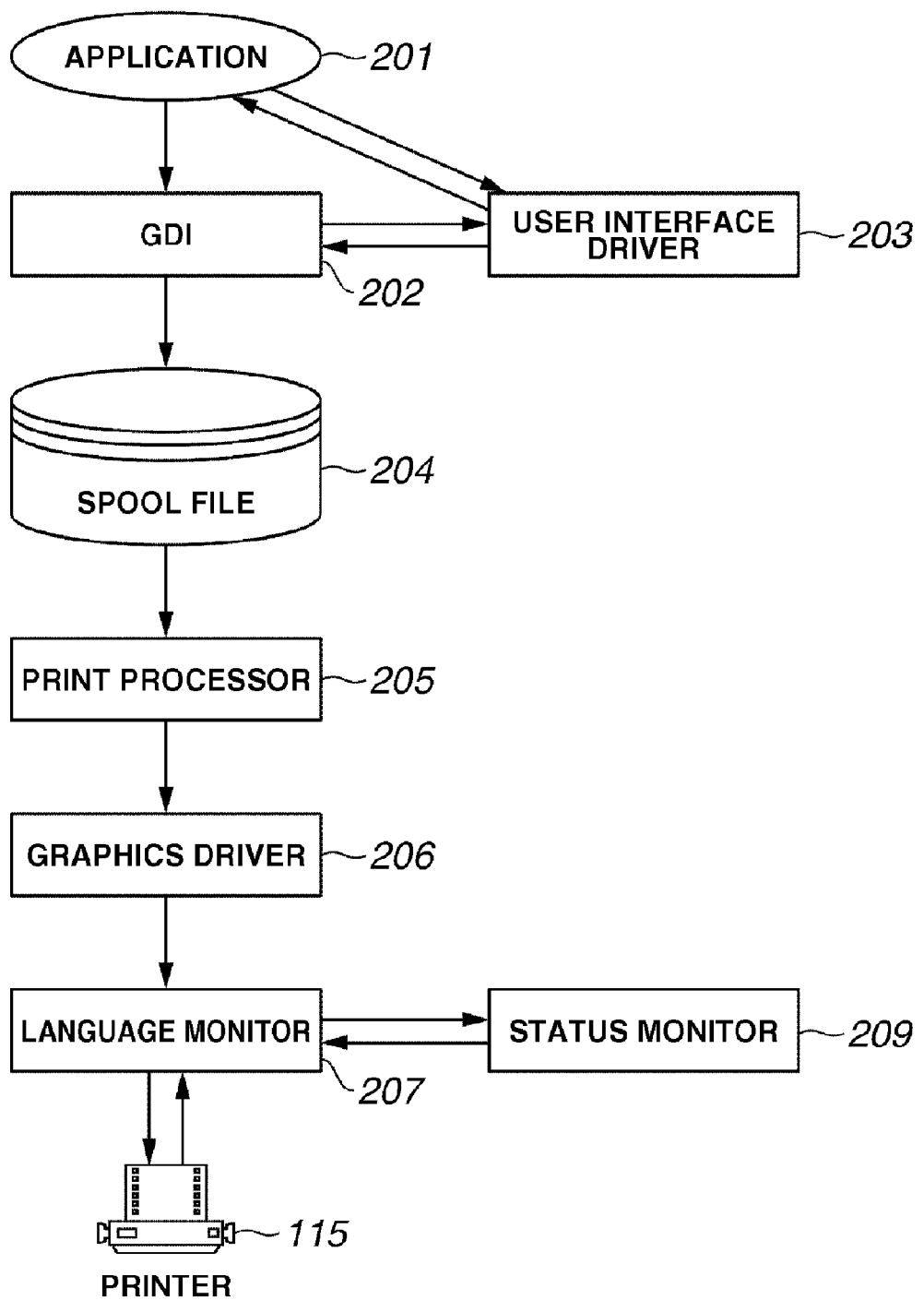
FIG. 2 is a block diagram illustrating a software configuration of a print system according to the exemplary embodiment of the present invention.

FIG. 2 is a block diagram illustrating a configuration of software (mainly printer drivers) that runs on the information processing apparatus according to the exemplary embodiment of the present invention. An application 201 creates a document. In order to print the created document, the application 201 inquires a user interface driver 203 on functions of the printer system, and then notifies the printing system including a graphic device interface (GDI) 202 of the operating system on start of print. After receiving the notification on start of print from the application 201, the GDI 202 notifies the user interface driver 203 on the print event of start of print by the application 201.

The application 201 then supplies print data (print job) of a document to be printed to the GDI 202. The print data is stored in a spool file 204 via the GDI 202.

A print processor 205 reads out the print data from the spool file 204. The print data is then sent to a language monitor 207 via a graphics driver 206.

The language monitor 207 communicates bi-directionally with the printer 115 and sends the print data to the printer 115. The printer 115 includes a sensor that can detect a type of printing paper set in a paper feed port, and the language monitor 207 receives information on the type of printing paper set in a paper feed port from the printer 115 as needed.

Moreover, the language monitor 207 informs a status monitor 209 on the present status of the printer 115 or the print status, based on information received from the printer 115 or on print data that the language monitor 207 sends to the printer 115. The status monitor 209 displays the received statuses of the printer 115 or of printing. In addition, in a case where printing is stopped for some reason, the status monitor 209 displays options for the next procedure to a user. Upon receiving a response input by the user, the status monitor 209 transmits the response to the language monitor 207.

Figure 3:
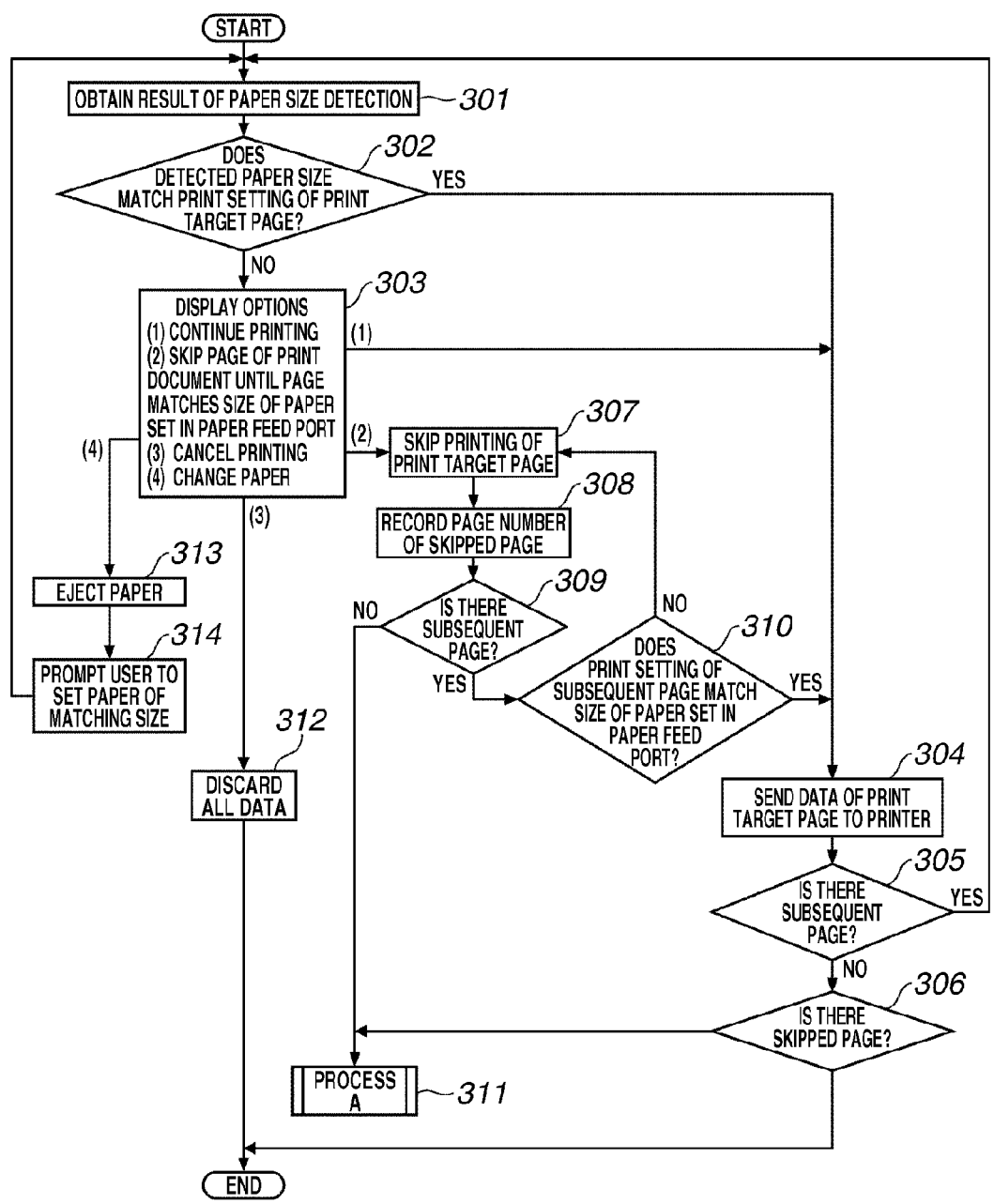
FIG. 3 illustrates a flowchart based on a control program for realizing a process for printing in a first exemplary embodiment of the present invention.

FIG. 3 illustrates a flowchart of a process based on a control program which is executed by the CPU 107 of the information processing apparatus according to the exemplary embodiment of the present invention. In the present exemplary embodiment, paper size which is one of the parameters of paper type will be described as an example. However, any parameter of the paper type that can be determined by a media sensor is applicable.

In step 301, the language monitor 207 obtains a result of detecting a paper size of a printing paper set in the printer 115, before sending a print data to the printer 115. That is, the media sensor 1003 in the printer 115 determines the type of printing paper that will be fed, and notifies the language monitor 207 on the determination result. The language monitor 207 can also request the determination result of the paper size as needed before sending the print data.

In step 302, the language monitor 207 compares the paper size which is included in a print setting of the present print target page with the paper size obtained as the determination result in step 301.

In the present exemplary embodiment, print data denotes print data of a print document that is generated by a user using an application, such as for example, a word processor application. Moreover, the print document in the present exemplary embodiment includes a plurality of pages, and a unique print setting can be made for each of the plurality of pages. Furthermore, the language monitor 207 analyzes print settings in order, starting from the first page of the print data, and can obtain contents of the print settings. Consequently, the language monitor 207 can send to the printer 115 a content of a setting for each page data as a print data. In the present exemplary embodiment, a page in the print data which the language monitor 207 is analyzing during printing and will be sending to the printer 115 as page data will be referred to as a print target page. Furthermore, a page data is data corresponding to each page in a print document and can be data consisting of a plurality of line data.

In a case where the paper size included in a print setting of the present print target page matches the paper size obtained as the determination result in step 301 (YES in step 302), the process proceeds to step 304. In step 304, the language monitor 207 sends the page data of the print target page to the printer 115, so that the printer 115 proceeds with printing. In step 305, the language monitor 207 determines whether there is data of a page subsequent to the page data sent to the printer 115 in step 304 in the print data. If there is a subsequent page (YES in step 305), the process returns to step 301.

If there is no data of a subsequent page in the print data (NO in step 305), the process proceeds to step 306. In step 306, the language monitor 207 determines whether there is a skipped page which will be described later. If there is no skipped page (NO in step 306), printing of all print data is completed, and the language monitor 207 ends printing. On the other hand, if there is a skipped page (YES in step 306), the process proceeds to step 311 in which the language monitor 207 performs a process A to be described later.

In step 302, if the paper size which is included in a print setting of the present print target page does not match the paper size obtained as the determination result in step 301 (NO in step 302), the process proceeds to step 303. In step 303, the status monitor 209 displays to a user options for the next procedure to be taken. For example, the options can be displayed on a selection screen on the CRT 101. In the present exemplary embodiment, the status monitor 209 displays the following four options to the user:

1. Continue printing (force printing on paper that is presently set in the paper feed port)
2. Skip pages of print document until page matches size of paper set in paper feed port (skip page data of the print data until the size of printing paper set in the paper feed port matches the size setting)
3. Cancel printing (force termination of the print process)
4. Change paper (change printing paper set in the paper feed port with printing paper of a size that matches the paper size setting of the print data)

In the present exemplary embodiment, the status monitor 209 performs the display control of displaying the above-described options. However, other modules that can send and receive information between the language monitor 207 can perform the display control. Moreover, the language monitor 207 can display the above-described options.

In a case where the user selects "1. Continue printing" from the options displayed in step 303, the process proceeds to step 304. In step 304, the language monitor 207 sends the page data to the printer 115 regardless of whether the paper size matches, to proceed with printing.

If the user selects "2. Skip pages of print document until page matches size of paper set in paper feed port" from the options displayed in step 303, the process proceeds to step 307. In step 307, the language monitor 207 skips an instruction to print the present print target page. A print target page in the print data which is skipped as described above will be referred to as a skipped page. Skip is a process in which printing of a page data in a print data is temporarily stopped, and another page data in the print data becomes the print target.

In step 308, the language monitor 207 records identification information for identifying a skipped page, such as a page number of the skipped page, in a recording medium, e.g., the HDD 110. The language monitor 207 can also record the page that is printed in step 304 in the recording medium, so that the skipped page can be identified accordingly. Storing a skipped page in step 308 denotes storing information on a print data which is not sent to the printer 115, i.e., the page that is temporarily not printed.

In step 309, the language monitor 207 determines whether there is a subsequent page in the print data. If there is no subsequent page (NO in step 309), the process proceeds to step 311, i.e., process A. On the other hand, if there is a subsequent page (YES in step 309), the process proceeds to step 310. In step 310, the language monitor 207 determines whether the print setting of the subsequent page matches the size of printing paper to be fed which is obtained in step 301. If the print setting does not match the size of printing paper to be fed (NO in step 310), the process returns to step 307, and the language monitor 207 skips printing of the subsequent page. On the contrary, if the print setting matches the size of printing paper to be fed (YES in step 310), the process proceeds to step 304. In step 304, the language monitor 207 sends the page data to the printer 115 and proceeds printing. As described above, by repeating steps 307 to 310, the language monitor 207 can skip pages until the size of paper set in the paper feed port matches the size setting of the print target page in the print data.

For example, a user instructs printing by setting the sizes of the first and fourth pages of print data as A4, and the second and third pages of the print data as A3, when four sheets of A4-size printing papers are set in the paper feed port of the printer 115. In such a case, after the printer 115 prints the first page, the options as described in step 303 are displayed to the user when the second page is to be printed. If the user selects option 2, the second and third pages whose size settings are A3 are recorded as skipped pages. The following fourth page is then printed. The printing process is thus performed in accordance with the printing papers set in the paper feed port.

If the user selects "3. Cancel printing" in step 303, the process proceeds to step 312. In step 312, the language monitor 207 discards all print data of the print target (i.e., print data of all pages) and ends printing. In addition, the language monitor 207 notifies the user and the printer 115 that the printing is cancelled.

If the user selects "4. Change paper" in step 303, the process proceeds to step 313. In step 313, the language monitor 207 executes a paper ejection command to eject printing papers set in the paper feed port. Upon receiving the instruction, the printer 115 ejects the printing papers set in the paper feed port, one sheet at a time. After the printing papers are ejected, the language monitor 207 informs the status monitor 209 on the paper size which matches the print setting of the print target page. In step 314, the status monitor 209 prompts the user on the appropriate printing paper to be newly set in the paper feed port. A UI screen which prompts a user to set a printing paper of an appropriate size (such as A3) can be displayed on the CRT 101.

Moreover, a user can notify the print system that the user changed the printing paper in the paper feed port by, for example, pressing an "OK" button set in the above-described UI screen. Furthermore, a sensor can be set on the paper feed port of the printer 115 to detect that the printing paper is changed. In such a case, the printer 115 can again warn the user if a paper mismatch is detected after the user changed the printing paper. In either case, the process returns to step 310 after the print system detects that the printing paper is changed.

Figure 8:
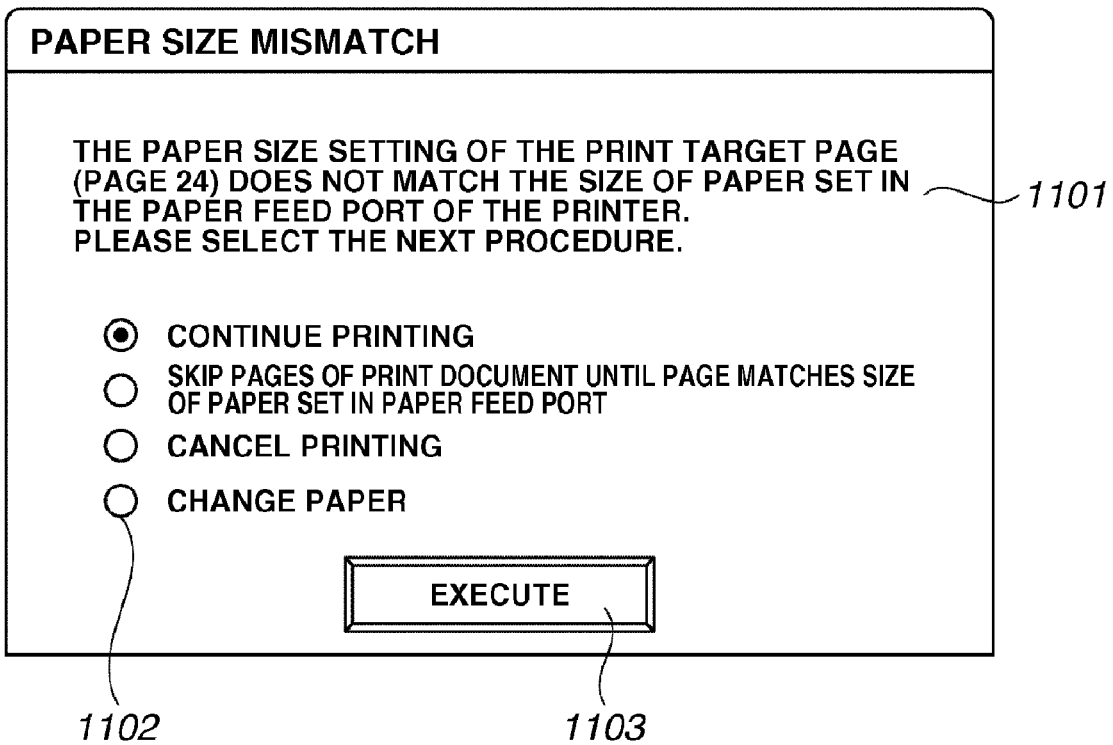
FIG. 8 illustrates a user interface (UI) screen which is displayed when there is a paper size mismatch in the first exemplary embodiment of the present invention.

FIG. 8 illustrates an example of a UI screen for notifying a user on a paper size mismatch in step 303. The present exemplary embodiment displays a message in an area 1101, notifying a user that there is a paper size and prompting the user to select the next procedure. The user selects the next procedure from the options displayed by radio buttons 1102, and presses a "execute" button 1103 to execute the selected procedure. FIG. 8 illustrates a case where there is a mismatch in the paper size. However, the present invention is not limited to the above, and a similar UI screen can be used to notify a user when there is a mismatch between a print setting that a user can designate from a print application and the type of printing paper set in the paper feed port.

Figure 4:
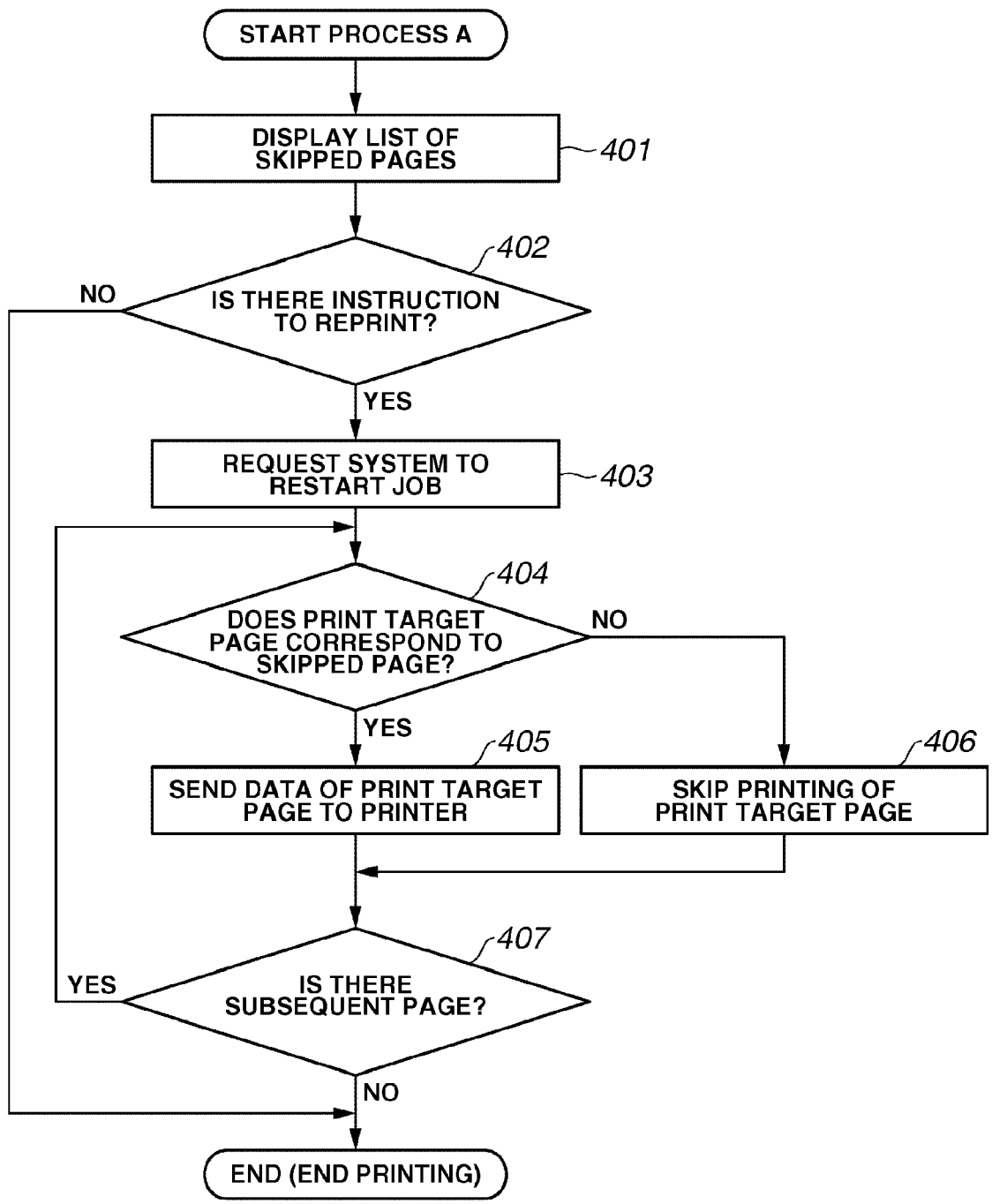
FIG. 4 is illustrates a flowchart based on a control program for realizing a process for reprinting a skipped page.

A process performed when page data is skipped during a printing process, i.e., process A in step 311 after the process proceeds from step 309 or step 306 in the flowchart illustrated in FIG. 3, will be described below by referring to FIG. 4. FIG. 4 illustrates a flowchart based on a control program related to process A which is executed by the CPU 107. The control program which is executable by the CPU 107 is stored in a recording medium such as ROM 108, RAM 109, or HDD 110.

In step 401, the status monitor 209 reads out a skipped page from the recording medium in which the language monitor 207 stored the skipped page in step 308. The status monitor 209 then performs display control for displaying the information on the skipped pages on a display, such as a UI screen illustrated in FIG. 9. In the UI screen, an inquiry on whether the user wishes to reprint the skipped pages is displayed in an area 1201, and the list of page numbers of the skipped pages are displayed in an area 1202. The user instructs whether to reprint the skipped pages by pressing a button 1203 ("YES") or a button 1204 ("NO") on the UI screen. The paper size set for each skipped page can also be displayed on the UI screen, so that the user can confirm whether the type of printing paper set in the paper feed port is appropriate.

Moreover, a print setting screen of each skipped page can be displayed in addition to the above-described UI screen, so that a user can reprint after changing the print setting of the skipped page. It would be sufficient if at least the information on the paper size which caused the printing to be skipped can be displayed as the print setting.

Figure 9:
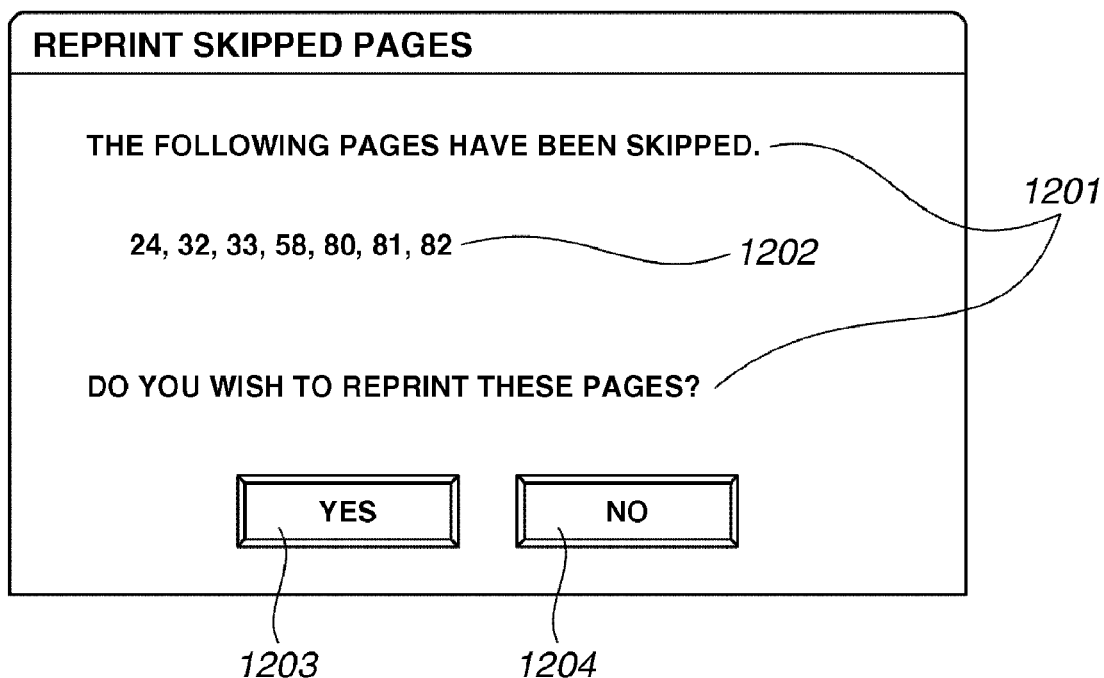
FIG. 9 illustrates a UI screen which gives guidance for reprinting a skipped page in the first exemplary embodiment of the present invention.

In step 402, the language monitor 207 determines whether the user instructed reprinting of the skipped pages through the UI screen illustrated in FIG. 9. If the user instructed reprinting (YES in step 402), the process proceeds to step 403. On the other hand, if the user did not instruct reprinting of the skipped pages (NO in step 403), the language monitor 207 discards the print data and ends printing.

In step 403, the language monitor 207 requests the system to restart print data (or print job).

When print data (or print job) is restarted to reprint the skipped page, the process proceeds to step 404. In step 404, the language monitor 207 determines whether the present print target page was skipped in the printing process performed before the process proceeded to process A in the flowchart of FIG. 3. The determination is made based on information which is recorded in step 308. If the print target page is a skipped page (YES in step 404), the process proceeds to step 405. In step 405, the language monitor 207 sends the page data to the printer 115. If the print target page is not a skipped page (NO in step 404), the process proceeds to step 406. In step 406, the language monitor 207 skips printing of the print target page.

In step 407, the language monitor 207 determines whether there is a subsequent page in the print data. If there is a subsequent page (YES in step 407), the process returns to step 404. If there is no subsequent page (NO in step 407), the language monitor 207 ends printing.

The present exemplary embodiment is applicable to a case where paper type settings of each page of print data are different, and the number of types of paper that can be set in a paper feed port is less than the number of types of paper designated in the print data. The present exemplary embodiment is effective in a low-end printer such as a home-use printer which has only one paper feed port and only one type of printing paper can be set in the paper feed port.

To be more precise, in the present exemplary embodiment, when the print setting of each page of print data and the type of printing paper to be fed by a paper feed port are different, the printing of the pages that do not match can be skipped. As a result, priority is given to printing the data that can be printed on the printing paper which is presently set in the paper feed port. Moreover, the skipped pages can be collectively printed later, and if the appropriate type of printing paper is set in the paper feed port, the skipped pages can be consecutively reprinted.

Therefore, in a case where pages of various paper sizes are included in a document (print job), printing can be collectively performed for each paper type in accordance with the printing paper set in a paper feed port. Moreover, since skipped pages can be readily reprinted, a user can easily change printing papers in a paper feed port in a case where a document (print job) includes pages of various paper sizes. The work efficiency of a user is thus improved.

According to the present exemplary embodiment, it is not necessary for a user to perform a burdensome process in a case where pages of various paper sizes are included in a document (print job). That is, the user does not need to calculate the number of types of printing papers before setting the printing papers in a paper feed port, or confirm the number of printouts and set a printing paper every time a page is to be printed. Furthermore, the user does not need to recreate print data for each paper type.

Moreover, according to the present exemplary embodiment, when an appropriate type of printing paper is not set in a paper feed port, a screen is displayed for a user to select print cancelling or continue printing, and for prompting the user to change paper set in the paper feed port. Such a display is useful for a user and improves the work efficiency in printing.

Second Exemplary Embodiment

In the first exemplary embodiment, if a user instructs print cancelling in step 303 of the flowchart illustrated in FIG. 3, the language monitor 207 discards all data. In a second exemplary embodiment, the language monitor 207 searches whether there is a skipped page when the user instructs print cancelling. In a case where there is a skipped page, the language monitor 207 displays a UI screen as illustrated in FIG. 9 and confirms a user on whether the user needs to reprint the skipped page. If the user instructs reprinting, the language monitor 207 reprints the skipped page as in the first exemplary embodiment.

According to the present exemplary embodiment, when a user does not need to output pages that follow the page at which the user cancels printing, and needs to output the previous pages, the user can reprint just the previously skipped pages. As a result, the present exemplary embodiment can provide an easy and user-friendly print system to a user.

Third Exemplary Embodiment

Figure 5:
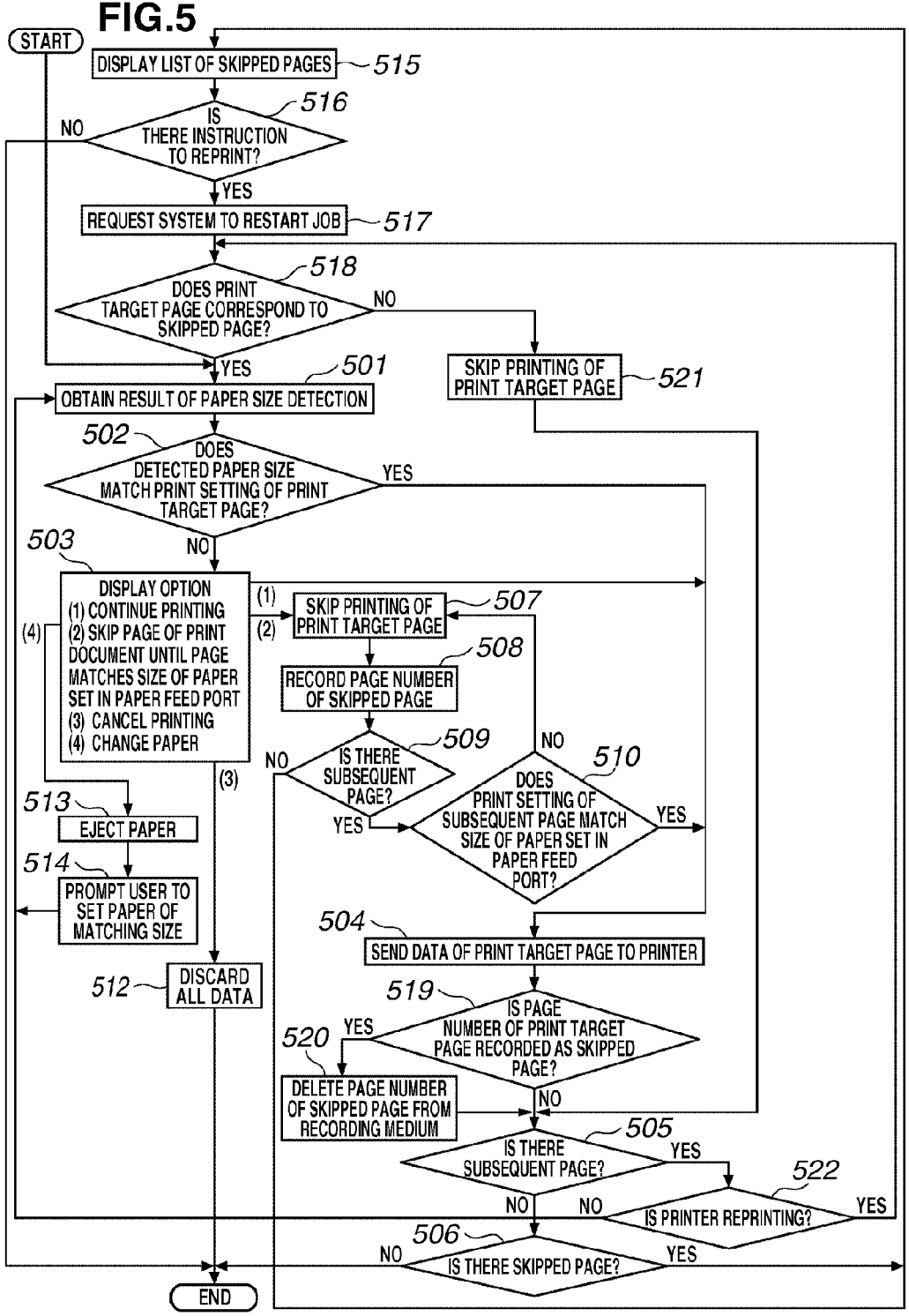
FIG. 5 illustrates a flowchart based on a control program for realizing a process for printing in a third exemplary embodiment of the present invention.

A case where printing is further skipped when there is a paper type mismatch in process A of the flowchart illustrated in FIG. 4 in the first and second exemplary embodiments is described in the third exemplary embodiment. FIG. 5 illustrates a flowchart of the control program of the printing process according to the third exemplary embodiment, which is a combination of the flowcharts illustrated in FIGS. 3 and 4. The flowchart illustrated in FIG. 3 is realized by the CPU 107 executing the control program.

Steps 301 to 303, 307 to 310, and 312 to 314 in the flowchart illustrated in FIG. 3 and steps 501 to 503, 507 to 510, and 512 to 514 in the flowchart illustrated in FIG. 5 perform similar processes. The differences from the first and second exemplary embodiments, that are the feature of the present exemplary embodiment, will be described below.

In step 504, the language monitor 207 sends the page data of the print target page to the printer 115, so that the printer 115 proceeds printing.

In step 519, the language monitor 207 determines whether the page number of the page sent to the printer 115 in step 504 is recorded as a skipped page in step 508. If the page number is recorded as a skipped page in step 508 (YES in step 519), the process proceeds to step 520. In step 520, the language monitor 207 deletes the page number of the page sent to the printer 115 in step 504, i.e., the skipped page, from the recording medium on which the page number is recorded in step 508.

On the contrary, if the page number of the page sent to the printer 115 in step 504 is not recorded as a skipped page in step 508 (NO in step 519), the process proceeds to step 505. In step 505, the language monitor 207 determines whether there is a data of a subsequent page in the print data.

If there is a data of a subsequent page in the print data (YES in step 505), the process proceeds to step 522. In step 522, the language monitor 207 determines whether the present printing process is a reprinting of a skipped page. A reprinting process is a printing process performed after it is determined that a user instructed reprinting at least once in step 402.

If the language monitor 207 determines that the printing process is a reprinting of a skipped page (YES in step 522), the process proceeds to step 518 to return to the reprinting process of the skipped page. If the printing process is not a reprinting of a skipped page (NO in step 522), the process proceeds to step 501.

In step 505, if it is determined that there is no data of a subsequent page in the print data (NO in step 505), the process proceeds to step 506. In step 506, the language monitor 207 determines whether there is a skipped page. If there is no skipped page (NO in step 506), all data is printed, and the language monitor 207 ends printing. On the contrary, if there is a skipped page (YES in step 506), the process proceeds to step 515.

In step 515, the status monitor 209 displays a UI screen on the skipped page, as illustrated in FIG. 9. The processes in steps 515 to 518 are similar to steps 401 to 404 in the flowchart illustrated in FIG. 4. Moreover, only the pages in the print data that are skipped and have not been once printed are displayed as skipped pages in step 515 by performing the process of step 520.

In step 518, the language monitor 207 determines whether the print target page is a skipped page. If the print target page is a skipped page (YES in step 518), the process proceeds to step 501. If the print target page is not a skipped page (NO in step 518), the process proceeds to step 521.

In step 521, since the present print target page is not a skipped page and is an already printed page, the language monitor 207 skips the print target page to avoid unnecessary printing. The process then proceeds to step 505 to determine whether there are other skipped pages in the print data.

Moreover, in the present exemplary embodiment, a plurality of types of paper can be set in the print settings of the skipped pages that are displayed on the UI screen illustrated in FIG. 9. Therefore, the paper size which is set to each skipped page can be displayed to a user, as described earlier. As a result, the user can correctly determine the type of printing paper to be set in a paper feed port.

According to the present exemplary embodiment, when three or more types of paper are set in the print settings of print data, re-reprinting on a printing paper that could not be set in the first reprinting can be easily performed.

Fourth Exemplary Embodiment

Figure 6:
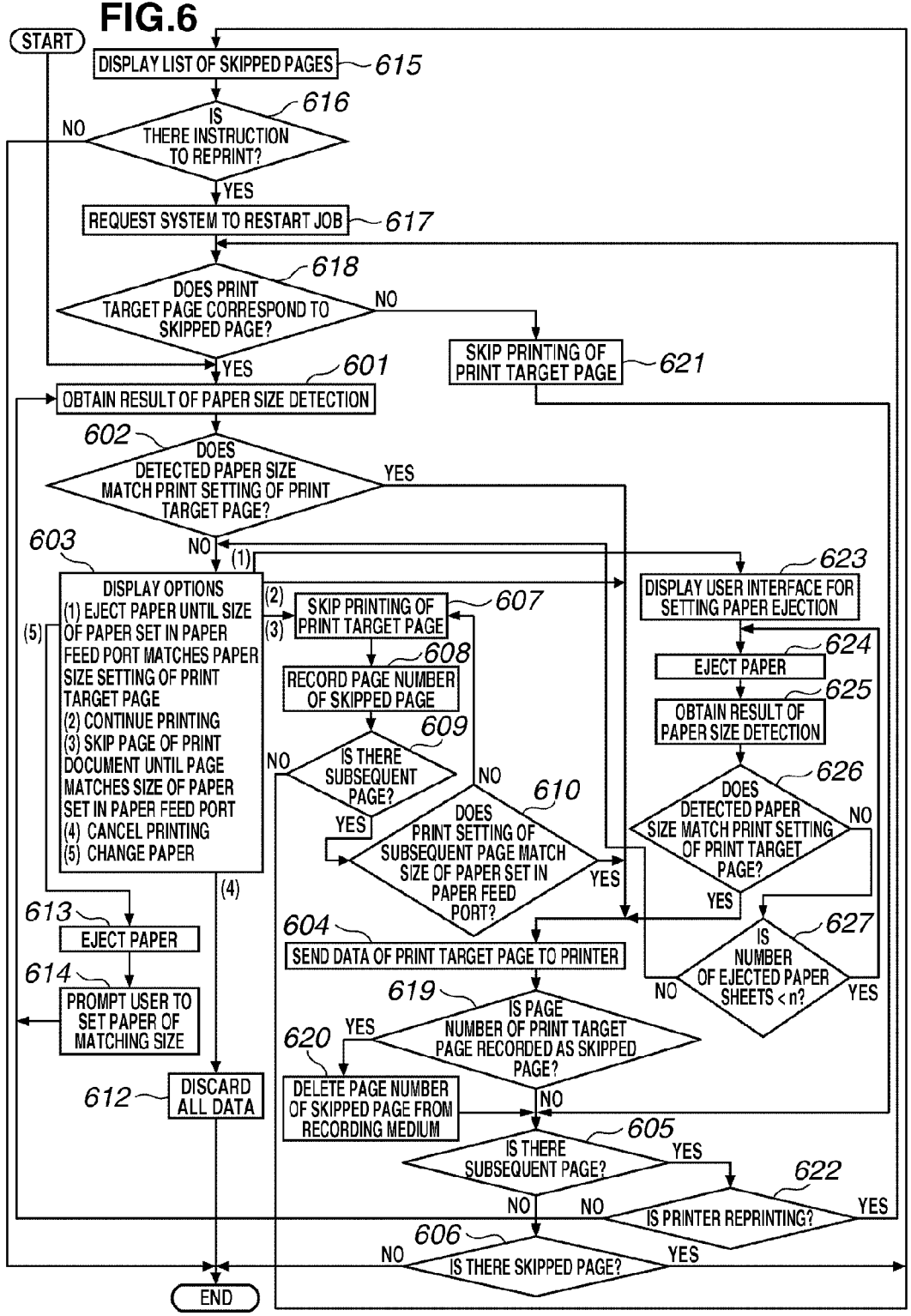
FIG. 6 illustrates a flowchart based on a control program for realizing a process for printing in a fourth exemplary embodiment of the present invention.

The control flow of a fourth exemplary embodiment according to the present invention will be described by referring to a flowchart illustrated in FIG. 6. Since the process of the flowchart illustrated in FIG. 6 is similar the process of the flowchart illustrated in FIG. 5, the difference between the processes, i.e., steps 623 to 627, will be described in detail.

The difference between the processes is that an option described in FIG. 10, i.e., "eject paper until paper set in paper feed port matches paper size setting of print target page" (1301) is displayed when there is a paper size mismatch. If a user selects such an option, the printer 115 notifies the language monitor 207 on the type of printing paper which is detected every time a printing paper set in the paper feed port is ejected. When the paper type (paper size) which matches the print setting of the print target page is detected, the language monitor 207 sends the page data of the print target page to the printer 115 and continues printing.

In step 602, the language monitor 207 compares the paper size which is included in the print setting of the present print target page with the paper size obtained as a determination result in step 601. If the size setting does not match the paper size obtained in step 601 (NO in step 602), the process proceeds to step 603. In step 603, the status monitor 209 displays the options of the next procedure to be taken to a user. For example, a selection screen can be displayed on the CRT 101. In the present embodiment, the status monitor 209 displays five options as illustrated in FIG. 10 to the user.

If a user selects "eject paper until paper set in the paper feed port matches paper size setting of print target page" in step 603, the process proceeds to step 623.

Figure 11:
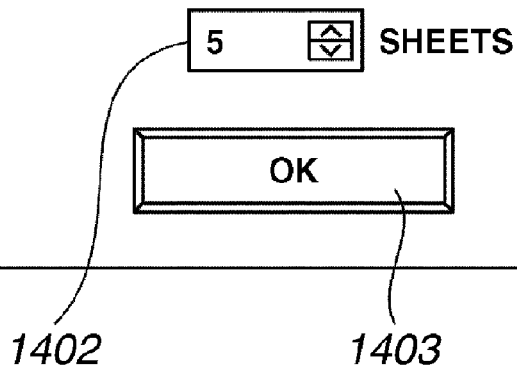
FIG. 11 illustrates a UI screen which is displayed for a user to make a paper ejection setting in the fourth exemplary embodiment of the present invention.

If a user sets a large number of sheets of printing paper of a same size in a paper feed port, it may be troublesome for ejection to continue until all of the printing papers are ejected. Therefore, in step 623 of the present exemplary embodiment, the status monitor 209 displays a UI screen as illustrated in FIG. 11. The UI screen displays that when a printing paper which matches the paper size setting does not appear after an appropriate number of sheets of printing paper is ejected, the UI screen which displays the options described in step 603 will again be displayed. A predetermined default value can be set as the number of sheets of printing paper to be ejected until the options are re-displayed. Moreover, the number of sheets of printing paper to be ejected until the options are re-displayed can be input by the user each time the user selects "eject paper until paper set in paper feed port matches paper size setting of print target page" in step 603. In the present exemplary embodiment, the options described in step 603 are displayed when n sheets of printing paper are ejected.

In step 624, the language monitor 207 sends a paper ejection command to the printer 115. Consequently, the printer 115 ejects the printing papers set in the paper feed port.

In step 625, the language monitor 207 obtains the result of detecting the type of printing paper presently set in the paper feed port, similar to step 601.

In step 626, the language monitor 207 determines whether the result of detecting the subsequent paper type matches the print setting of the print target page. In a case where the detection result does not match the print setting (NO in step 626), the process proceeds to step 627. In step 627, the language monitor 207 determines whether the number of sheets of printing paper that is ejected is less than n. If less than n sheets of paper are ejected (YES in step 627), the process returns to 624, and the printer 115 additionally ejects one sheet of printing paper set in the paper feed port. On the other hand, in step 627, if n sheets of printing paper are ejected (NO in step 627), the process returns to step 603, and the status monitor 209 displays the options.

In a case where the result of detecting the paper type obtained in step 625 matches the print setting of the print target page (YES in step 626), the process proceeds to step 604.

In the present exemplary embodiment, an entry field 1402 is provided in the UI screen for making an ejection setting. In the entry field 1402, a user can input the number of printing papers to be ejected before the options displayed in step 603 are re-displayed. A certain value, such as "5" sheets, can be originally set as an initial value. If a user wishes to continue the process using the number input in the input field 1402, the user presses the "OK" button 1403.

For example, a user prints a print data using an application which can create a document, such as a photo album, catalogue, or book, including a front cover, bookblock, illustration page, and a back cover whose types of paper vary. By using a system according to the present exemplary embodiment, the user does not need to search the number of sheets required for each paper type, or to place the sheets in a correct order. Moreover, if a user sets a generous amount of sheets or types of printing papers, the user does not need to newly add printing papers during printing.

Moreover, for example, a user instructs printing by setting the first and fourth pages as A4-size and the second and third pages as A3-size. The user sets 4 sheets of A3-size paper on top of 4 sheets of A4-size paper in a paper feed port of the printer 115, in which a plurality of types of printing paper can be set in one paper feed port.

In such a case, after the first page is printed, the print system displays the options in step 603 in printing the second page. If the user selects option 3, the print system records the second and third pages as skipped pages because the size settings of the second and third pages are A3. The fourth page is then printed. When the skipped pages are to be printed, the print system again displays the options of the step 603 because the print setting of the second page does not match the size of printing paper set in the paper feed port. If a user selects option 1, the A4-size papers that match the first and fourth pages are ejected from the paper feed port. The data of the second and third pages are then printed on the A3-size papers, and the printing process ends.

As described above, according to the present exemplary embodiment, a user randomly sets a plurality of types of printing paper in a paper feed port and selects an option through a UI screen. Consequently, the user can easily perform printing of print data whose print settings are different for each page, without changing the printing papers in the paper feed port. Therefore, the printing efficiency is improved.

Moreover, there are cases where a user sets a plurality of types of printing paper in a wrong order, or several sheets of an incorrect type of printing paper slip into the printing papers set in the paper feed port. The present exemplary embodiment ejects printing papers from the paper feed port until the matching printing paper is obtained, so that a user does not need to reconfirm the types of printing paper set in the paper feed port. Thus, the work efficiency is improved.

In a case where a print setting of a print target page does not match a type of paper in a paper feed port and a user is to select either option 1 or option 3 in step S603 in the flowchart illustrated in FIG. 6, the information processing apparatus can urge a user to preferentially select option 3 over option 1 through a UI screen. The reason for urging a user to select option 3 over option 1 is to prevent ejecting printing paper as much as possible. Print paper ejection according to option 1 can cause traces of a conveying roller in the printer to remain on certain types of printing paper (such as photo paper). The information processing apparatus according to the present invention may urge the user to select option 1 if printing is discontinued when a user selects option 3 in reprinting a skipped page.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-017878 filed Jan. 29, 2007, which is hereby incorporated by reference herein in its entirety.

What is claimed is:

1. An information processing apparatus comprising:
   an obtaining unit configured to obtain information about a paper type of a printing paper which is fed from a paper feed port of a printing apparatus;
   a paper ejection command sending unit configured to send to the printing apparatus a paper ejection command for ejecting a printing paper set in the paper feed port;
   a determination unit configured to determine whether a print setting of a print target page matches information about a paper type obtained by the obtaining unit;
   a sending unit configured to send to the printing apparatus data of a print target page if the determination unit determines that a print setting of a print target page matches information about a paper type obtained by the obtaining unit;
   a processing unit configured to, if the determination unit determines that a print setting of a print target page does not match information about a paper type obtained by the obtaining unit, perform one of (1) causing the paper ejection command sending unit to repeat sending to the printing apparatus a paper ejection command and the obtaining unit to repeat obtaining information about a type of a printing paper fed from the paper feed port after the printing apparatus has executed a paper ejection in response to the paper ejection command until the determination unit determines that the obtained information about a type of a printing paper fed from the paper feed port matches a print setting of the print target page, and causing the sending unit to send data of a print target page when a print setting of a print target page matches information about a type of a printing paper fed from the paper feed port, or (2) storing information about the print target page in a storage unit and causing the determination unit to determine whether a print setting of a page to be sent subsequent to the print target page in the print data matches the obtained information about a type of a printing paper fed from the paper feed port; and
   a second display control unit configured to perform control of a display that confirms a user whether to print a page corresponding to information stored in the storage unit, wherein the instruction unit instructs reprinting in accordance with input of a user based on a display by the second display control unit.

2. An information processing apparatus according to claim 1, further comprising a first display control unit configured to perform control of a display that notifies a user of a paper type mismatch if the determination unit determines that a print setting of a print target page does not match information about a paper type obtained by the obtaining unit.

3. An information processing apparatus according to claim 2, wherein the first display control unit performs control of a display that allows a user to select a process among a plurality of processes to be performed by the processing unit, and
   wherein the processing unit performs a process if a user selects that the processing unit performs a process among a plurality of processes in accordance with a display by the first display unit.

4. An information processing apparatus according to claim 2, wherein the first display control unit performs control of a display that allows a user to select cancelling of a print process, and
   wherein the processing unit cancels a printing process if a user selects cancelling of a print process in accordance with a display by the first display control unit.

5. An information processing apparatus according to claim 1, wherein the second display control unit performs control to display a print setting of a page corresponding to information stored in the storage unit.

6. An information processing apparatus according to claim 1, wherein the second display control unit performs control of a display for changing a print setting of a page corresponding to information stored in the storage unit.

7. An information processing apparatus according to claim 1, wherein the first display control unit performs control of a display that notifies a user of a paper type mismatch if a set number of printing paper are ejected in accordance with a paper ejection command sent by the paper ejection command sending unit.

8. An information processing apparatus according to claim 1, further comprising a third display control unit configured to perform control of a display for sending a paper ejection command from the paper ejection command sending unit, and prompting a user to change a printing paper to be set in the paper feed port.

9. A method comprising:
   obtaining information about a paper type of a printing paper which is fed from a paper feed port of a printing apparatus;
   determining whether a print setting of a print target page matches the obtained information about a paper type of a printing paper which is fed from the paper feed port;
   sending to the printing apparatus a data of a print target page to print the print target page if it is determined that a print setting of a print target page matches the obtained information about a paper type of a printing paper which is fed from the paper feed port;
   if it is determined that a print setting of the print target page does not match the obtained information about a type of a printing paper which is fed from the paper feed port, performing one of (1) a process of sending to the printing apparatus a paper ejection command for ejecting a printing paper set in the paper feed port, and sending data of a print target page when a print setting of a print target page matches information about a paper type of a printing paper fed from the paper feed port after the printing apparatus has executed a paper ejection in response to the paper ejection command, or (2) a process of storing information about the print target page in a storage unit and determining whether a page to be sent subsequent to the print target page in the print data matches the obtained information about a type of a printing paper fed from the paper feed port; and
   displaying to confirm a user whether to reprint a page corresponding to information stored in the storage unit by the processing step,
   wherein reprinting is instructed in the instructing step in accordance with input of a user based on displaying in the second display control step.

10. A method according to claim 9, wherein if it is determined that a print setting of the print target page does not match the obtained information about a type of a printing paper which is fed from the paper feed port, the process of sending to the printing apparatus a paper ejection command is repeated until it is determined that the obtained information about a type of a printing paper fed from the paper feed port matches a printing setting of the print target page.

11. A method according to claim 9, further comprising a first display controlling step of displaying to notify a user of a paper type mismatch if it is determined that a print setting of a print target page does not match the obtained paper type information.

12. A method according to claim 11, wherein displaying is performed in the first display control step to allow a user to select cancelling of a print process, and
   wherein a printing process is cancelled in the processing step if a user selects cancelling of a print process in accordance with a display by the first display control step.

13. A method according to claim 11, wherein the first display controlling step further includes displaying to allow a user to select a process among a plurality of processes to be performed, and
   wherein a process is performed if a user selects a process among a plurality of processes to be performed in accordance with a displaying in the first display controlling step.

14. A method according to claim 9, wherein a print setting of a page corresponding to information stored in the storage unit is displayed in the second display control step.

15. A method according to claim 9, wherein displaying is performed in the second display control step for a user to change a print setting of a page corresponding to information stored in the storage unit.

16. A method according to claim 9, wherein displaying to notify a user on a paper type mismatch is performed in the first display control step if a set number of sheets of printing paper is ejected in accordance with a paper ejection command in the paper ejection command sending step.

17. A method according to claim 9, further comprising a third display control step of displaying to send a paper ejection command in the paper ejection command sending step, and of prompting a user to change a printing paper to be set in the paper feed port.

18. A program stored in a non-transitory computer-readable recording medium, including instructions which, when executed by a computer, causes the computer to execute the method according to claim 9.

19. An information processing apparatus comprising:
   an obtaining unit configured to obtain information about a paper type of a printing paper which is fed from a paper feed port of a printing apparatus;
   a paper ejection command sending unit configured to send to the printing apparatus a paper ejection command for ejecting a printing paper set in the paper feed port;
   a determination unit configured to determine whether a print setting of a print target page matches information about a paper type obtained by the obtaining unit;
   a sending unit configured to send to the printing apparatus data of a print target page if the determination unit determines that a print setting of a print target page matches information about a paper type obtained by the obtaining unit;
   a processing unit configured to, if the determination unit determines that a print setting of a print target page does not match information about a paper type obtained by the obtaining unit, perform one of (1) causing the paper ejection command sending unit to repeat sending to the printing apparatus a paper ejection command and the obtaining unit to repeat obtaining information about a type of a printing paper fed from the paper feed port after the printing apparatus has executed a paper ejection in response to the paper ejection command until the determination unit determines that the obtained information about a type of a printing paper fed from the paper feed port matches a print setting of the print target page, and causing the sending unit to send data of a print target page when a print setting of a print target page matches information about a type of a printing paper fed from the paper feed port, or (2) storing information about the print target page in a storage unit and causing the determination unit to determine whether a print setting of a page to be sent subsequent to the print target page in the print data matches the obtained information about a type of a printing paper fed from the paper feed port; and
   an instruction unit configured to instruct reprinting of a page corresponding to information stored in the storage unit by the processing unit,
   wherein the processing unit stores information about the print target page in the storage unit and causes the determination unit to determine a page which is sent subsequent to the print target page as a print target page in the print data, if the determination unit determines that a print setting of a print target page does not match information about a paper type obtained by the obtaining unit, and wherein, if a print setting of a print target page does not match information about a paper type obtained by the obtaining unit in a case where the instruction unit instructs reprinting, the processing unit performs a process of causing the paper ejection command sending unit to repeat sending to the printing apparatus a paper ejection command and the obtaining unit to repeat obtaining information about a type of a printing paper after paper ejection until the determination unit determines that the obtained information about a paper type matches a print setting of the print target page, and causing the sending unit to send data corresponding to the print target page when information about a type of paper matches a print setting of the target page.

20. A method comprising:

obtaining information about a paper type of a printing paper which is fed from a paper feed port of a printing apparatus;

determining whether a print setting of a print target page matches the obtained information about a paper type of a printing paper which is fed from the paper feed port;

sending to the printing apparatus a data of a print target page to print the print target page if it is determined that a print setting of a print target page matches the obtained information about a paper type of a printing paper which is fed from the paper feed port;

if it is determined that a print setting of the print target page does not match the obtained information about a type of a printing paper which is fed from the paper feed port, performing one of (1) a process of sending to the printing apparatus a paper ejection command for ejecting a printing paper set in the paper feed port, and sending data of a print target page when a print setting of a print target page matches information about a paper type of a printing paper fed from the paper feed port after the printing apparatus has executed a paper ejection in response to the paper ejection command, or (2) a process of storing information about the print target page in a storage unit and determining whether a page to be sent subsequent to the print target page in the print data matches the obtained information about a type of a printing paper fed from the paper feed port; and instructing reprinting of a page corresponding to information stored in the storage unit, wherein, if it is determined that a print setting of a print target page does not match the obtained paper type information, information about the print target page is stored in the storage unit, and a page which is to be sent subsequent to the print target page is determined as a print target page, and wherein, if it is determined that a print setting of a print target page does not match the obtained paper type information in a case where reprinting is instructed, sending of a paper ejection command to the printing apparatus and obtaining information about a type of a printing paper after paper ejection is repeated until it is determined the obtained paper type information matches a print setting of the print target page, and sending data corresponding to the print target page when information about a type of paper matches a print setting of the target page.

* * * * *